United States Patent
Hiraga et al.

(10) Patent No.: US 7,262,381 B2
(45) Date of Patent: Aug. 28, 2007

(54) CONTROLLER FOR WIRE ELECTRIC DISCHARGE MACHINE

(75) Inventors: Kaoru Hiraga, Yamanashi (JP); Yuki Kita, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/258,950

(22) Filed: Oct. 27, 2005

(65) Prior Publication Data

US 2006/0091113 A1    May 4, 2006

(30) Foreign Application Priority Data

Oct. 28, 2004    (JP)    ............................. 2004-313911

(51) Int. Cl.
*B23H 7/04*    (2006.01)
*B23H 7/20*    (2006.01)

(52) U.S. Cl. .................................... 219/69.12; 700/162
(58) Field of Classification Search ............. 219/69.12; 700/162

See application file for complete search history.

(56) References Cited

U.S. PATENT DOCUMENTS

| | | | |
|---|---|---|---|
| 5,021,622 A * | 6/1991 | Magara et al. ........... | 219/69.12 |
| 5,756,954 A * | 5/1998 | Kamiguchi et al. ...... | 219/69.12 |
| 6,723,941 B2 * | 4/2004 | Sato et al. ................ | 219/69.12 |
| 6,998,562 B2 * | 2/2006 | Arakawa et al. ......... | 219/69.12 |
| 7,039,490 B2 * | 5/2006 | Kurihara et al. .......... | 700/162 |
| 2004/0193306 A1 | 9/2004 | Kurihara et al. | |

FOREIGN PATENT DOCUMENTS

| | | | |
|---|---|---|---|
| JP | 2-205413 A | * | 8/1990 |
| JP | 8-155744 | | 6/1996 |
| JP | 2000-84743 A | * | 3/2000 |
| JP | 2004-283968 | | 10/2004 |

* cited by examiner

*Primary Examiner*—Geoffrey S. Evans
(74) *Attorney, Agent, or Firm*—Staas & Halsey LLP (57) ABSTRACT

A controller for a wire cut electric discharge machine which can provide stable finish machining and corner-region machining with high corner-form accuracy. An electric discharge gap detection device detects a voltage between a wire electrode and a workpiece. A machining rate detection device obtains an average machining voltage and a drop voltage value Ex which is a difference between the obtained average machining voltage and a no-load voltage. A comparison device obtains the ratio Es/Ex between a reference drop voltage value Es stored in a reference machining rate relative value storage device and the obtained drop voltage value Ex. In machining of a corner portion, when the drop voltage value Ex exceeds a entrance-into-corner determination reference machining rate, a set feed speed switch device supplies a corner set feed speed, and when the machining of the corner portion finishes, so that the drop voltage value Ex decreases to a leaving-from-corner determination reference machining rate or lower, the set feed speed switch device supplies a normal set feed speed. A feed pulse calculation device obtains a feed speed which makes the rate of machining constant, on the basis of the ratio Es/Ex and the supplied feed speed, to thereby drive motors. Since the rate of machining is kept constant, the surface accuracy of finish machining is high and stable machining can be performed.

10 Claims, 9 Drawing Sheets

Gs , Gx : WIDTH OF PORTION TO BE REMOVED

Vx , Vs : AVERAGE MACHINING VOLTAGE

Vo : NO-LOAD VOLTAGE

Vs < Vx IN THIS CASE

$\delta s$ : REFERENCE MOTION AMOUNT PER UNIT TIME $\delta x$ : MOTION AMOUNT PER UNIT TIME
 $= \delta s * (Vo-Vs)/(Vo-Vx)$ t : THICKNESS

S: AREA OF ELECTRIC DISCHARGE $\propto G \times t$

CONTROLLER FOR WIRE ELECTRIC DISCHARGE MACHINE

BACKGROUND OF THE INVENTION

1. Field of the Invention

The present invention relates to a controller for a wire electric discharge machine, and particularly to a controller for controlling the wire electric discharge machine to perform finish machining of a second cut and subsequent cuts.

2. Description of Related Art

In the wire electric discharge machine, as methods of controlling the feeding of a wire electrode relative to a workpiece, a constant average machining voltage method and a constant feed speed method are known. The constant average machining voltage method controls the feed speed such that the average machining voltage across a gap between the workpiece and the wire electrode is constant, in order to increase the speed of first cutting, namely contour cutting first performed on the workpiece, and prevent the break of the wire electrode due to concentrated electric discharges. Hence, the constant average machining voltage method is not always suitable for finish machining after the first cutting, namely second cutting and subsequent machining, in which electric discharge machining is performed using a smaller electric discharge pulse current to improve surface roughness and accuracy. When the constant average machining voltage method is adopted, the feed control is performed while making various adjustments to minimize change in the amount of machining per unit time to stabilize electric discharge pulse density.

For example, the following technique for improving the machined surface roughness is known: In first cutting, when the average machining voltage becomes equal to a reference voltage value, or in other words, differential voltage becomes zero, feeding is stopped, and when the differential voltage becomes opposite in sign, feeding in the opposite direction is performed. In medium finishing in finish machining, when the average machining voltage becomes equal to the reference voltage value, namely the differential voltage becomes zero, control is performed such that feeding is performed at a set feed speed. In finishing after the medium finishing, the power source is switched to a high-frequency power source and the servo control proportional gain is made smaller (see JP 3231567B).

In the constant average machining voltage feed control, feeding cannot be performed with sufficient accuracy, since change in average machining voltage cannot reflect change in removal width (width of a part to be removed) accurately. Further, it is very difficult to choose a proper gain according to chance in average machining voltage corresponding to change in removal width. Hence, the conventional control has a problem that it cannot provide stable surface accuracy repeatedly. Also in the constant feed speed machining, it is difficult to improve the accuracy of machining.

Under the circumstances, the applicant has proposed a controller for a wire electric discharge machine which keeps the amount of machining constant without requiring the adjustment of gain, etc. in control of feeding a wire electrode relatively to a workpiece, to thereby provide stable machining and high surface accuracy, which has become publicly known as JP 2004-283968A.

Figure 6:
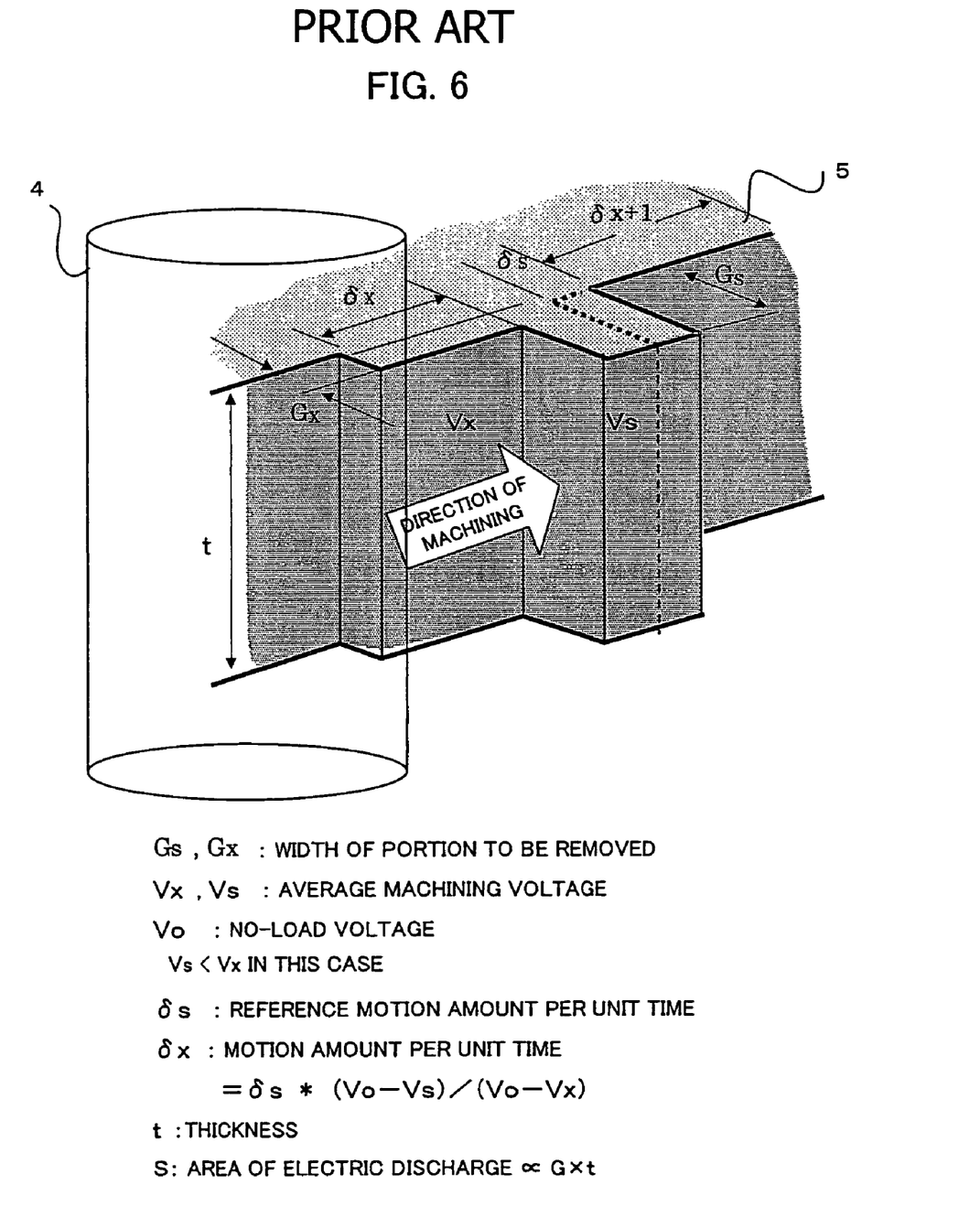
FIG. 6 is a prior art diagram for explaining how irregularities of a machined surface are made flat by finish machining to improve surface accuracy.

FIG. 6 is a diagram for explaining how irregularities of a machined surface are made flat by finish machining to improve surface accuracy.

In FIG. 6, reference sign 5 indicates a workpiece, and reference sign 4 a wire electrode. In order to achieve the purpose of finish machining, namely to make the irregularities of the machined surface of the workpiece 5 flat, the amount of feeding should be changed depending on change in removal width so that the amount of machining is constant. In FIG. 6, provided that ts (=t) and tx (=t) are board thicknesses, Gs and Gx are widths of portions to be removal, and δs and δx are amounts of movement per unit time T, $$\delta s * ts * Gs = \delta x * tx * Gx$$

$$\therefore \delta x = \delta s * (ts/tx) * (Gs/Gx) \quad (1)$$

Figure 7:
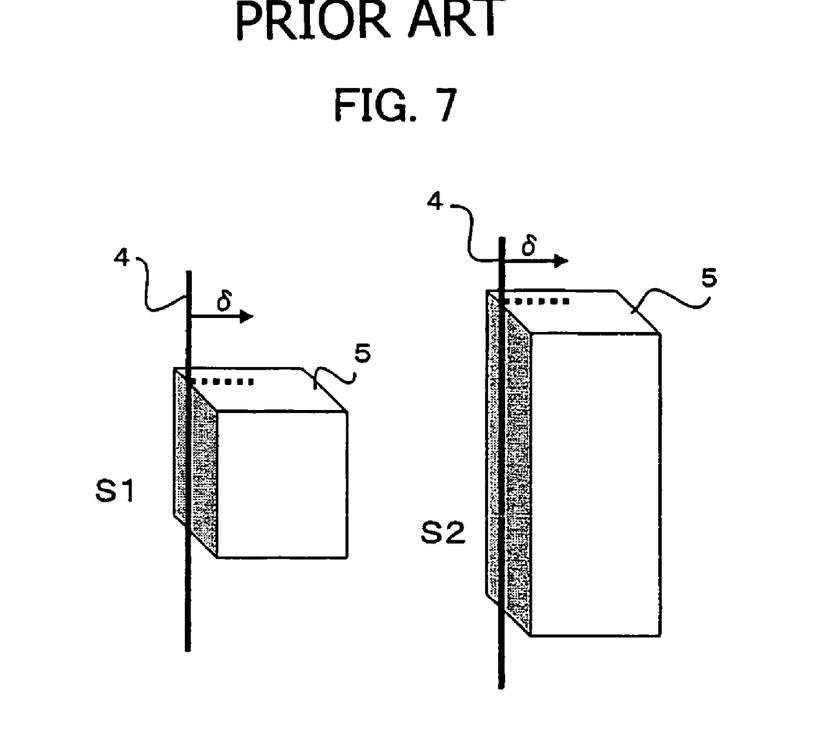
FIG. 7 is a prior art diagram for explaining the relation between the electric discharge area and the number of repetitions of electric discharge.
Figure 8:
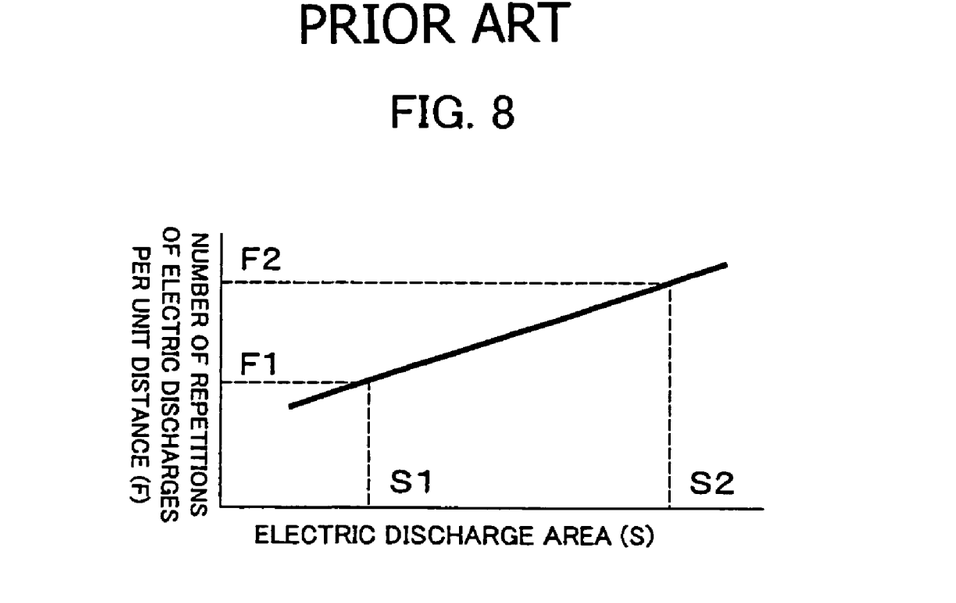
FIG. 8 is a prior art diagram showing the relation between the electric discharge area and the number of repetitions of electric discharge.

Here, as shown in FIG. 8, the area that undergoes electric discharges (referred to as "electric discharge area") S1, S2 as shown in FIG. 7 is proportional to the number of times that electric discharges are repeated (referred to as "number of repetitions of electric discharge") F1, F2 while unit distance δ is traveled. In other words, the number of repetitions of electric discharge F1, F2 is proportional to the amount of machining. Since the amount of machining per unit distance corresponds to the electric discharge area S, namely the board thickness t multiplied by the width G of the portion to be removed, the relation between ts*Gs, tx*Gx and the numbers of repetitions of electric discharge Fs, Fx is:

$$(ts*Gs)/(tx*Gx)=K*(Fs/Fx)$$

$$\therefore (ts/tx)*(Gs/Gx)=K*(Fs/Fx) \quad (2)$$

K: constant determined by machining conditions

Here, provided that δs is a reference motion amount, the reference motion amount is obtained from a reference feed speed SPDs which is preset and entered, as follows:

$$\delta s = SPDs * T \quad (3)$$

From equations (1), (2) and (3), the motion amount δx is:

$$\delta x = SPDs * T * K * (Fs/Fx) \quad (4)$$

Since δx/T=SPDx, $$SPDx = K * SPDs * (Fs/Fx) \quad (5)$$

Thus, the speed SPDx corresponding to the motion amount δx in the unit time T in the portion of the width Gx is the reference speed SPDs multiplied by the ratio Fs/Fx between the number of repetitions of electric discharge Fs in the portion of the width Gs of the part to be removed and the number of repetitions of electric discharge Fx in the portion of the width Gx. This means that when the number of repetitions of electric discharge Fx is obtained, the speed SPDx which makes the amount of machining equal to the reference amount of machining can be obtained on the basis of the ratio Fs/Fx, where the reference number of repetitions of electric discharge Fs can be obtained in advance. In other words, the ratio Fs/Fx is a value proportional to the amount of machining. Hence, feeding can be performed such that the amount of machining is constant, according to change in removal width.

Further, provided that average no-load time in the part where the motion amount is the reference amount δs is TW(S), average no-load time in the part where the motion amount is δx is TW(X), set no-load voltage is Vp, and pause time is TOFF, average machining voltages Vs and Vx in the respective parts are:

$$Vs = Vp * TW(S)/(TW(S)+TOFF) \quad (6)$$

$$Vx = Vp * TW(X)/(TW(X)+TOFF) \quad (7),$$

where electric discharge time TON is ignored since it is very short.

In this case, the numbers of repetitions of electric discharge Fs, Fx in the respective parts are:

$$Fs = 1/(TW(S) + TOFF) \quad (8)$$

$$Fx = 1/(TW(X) + TOFF) \quad (9)$$

Eliminating the average no-load times TW(S) and TW(X) from equations (6), (7), (8) and (9) gives $$Fs*TOFF = (Vp - Vs)Vp \quad (10)$$

$$Fx*TOFF = (Vp - Vx)Vp \quad (11)$$

When (Vp−Vs) is substituted by average drop voltage Es in standard machining and (Vp−Vx) is substituted by average drop voltage Ex, the above equations indicate that the average drop voltage Es, Ex is proportional to the number of repetitions of electric discharge Fs, Fx, and hence, the amount of machining.

Substituting equations (10) and (11) into equation (5) gives $$SPDx = K*SPDs*Es/Ex \quad (12)$$

Thus, the speed SPDx corresponding to the motion amount δX is the reference speed SPDs multiplied by the ratio between the average drop voltage in the part where the motion amount is the reference amount δs and the average drop voltage in the part where the motion amount is δx. This means that even when the number of repetitions of electric discharge cannot be obtained, the same result can be obtained from the no-load voltage and the average machining voltage as that obtained from the number of repetitions of electric discharge according to equation (5). The no-load voltage is a predetermined voltage and known. Hence, when the average machining voltage is detected, the average drop voltage Ex, and the ratio (Es/Ex) between the average drop voltage Es in standard machining and the average drop voltage Ex can be obtained. From this ratio and the reference speed SPDs, the speed SPDx which makes the amount of machining equal to the reference amount of machining can be obtained. Thus, feeding can be performed such that the amount of machining is constant, according to change in removal width.

Figure 9:
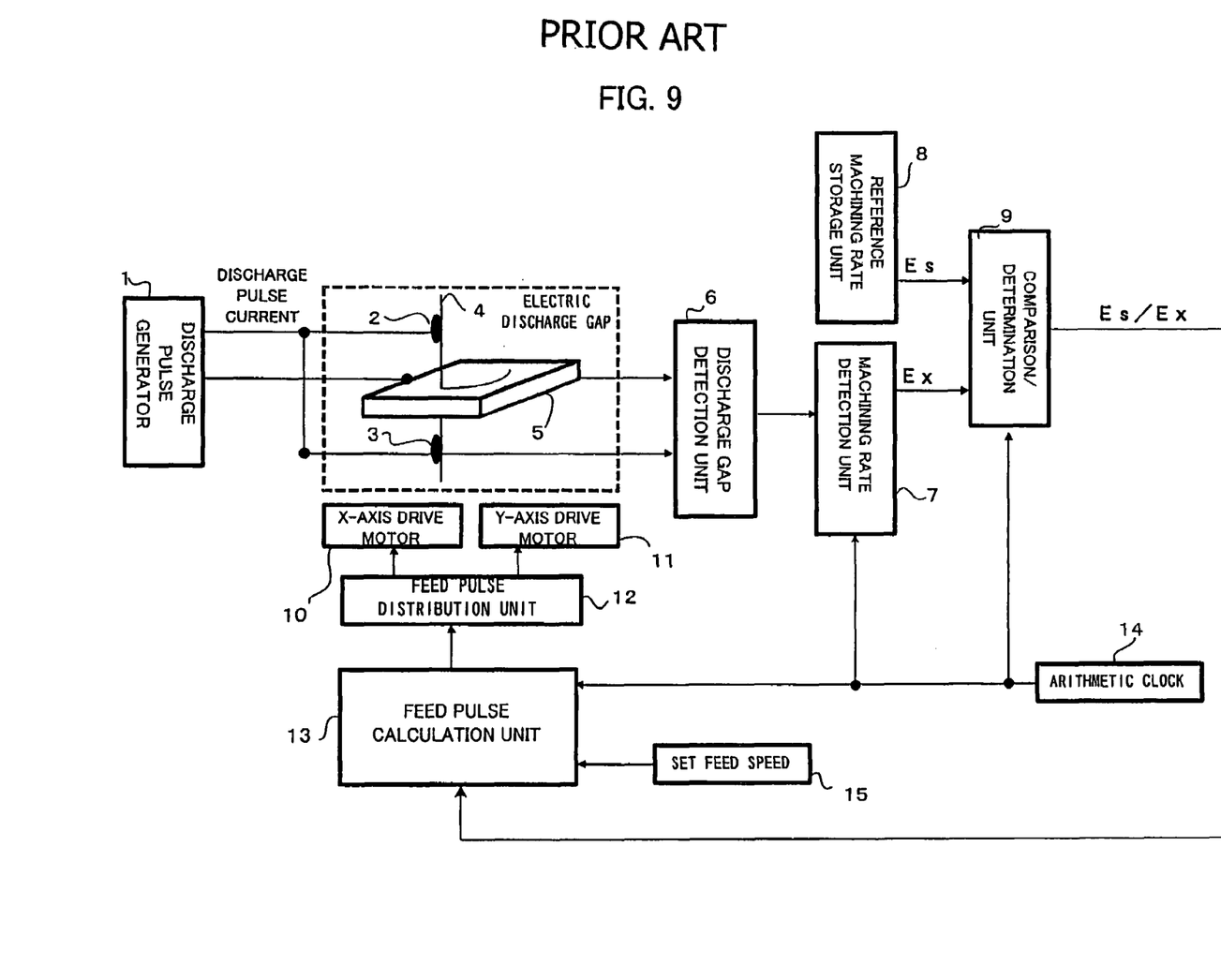
FIG. 9 is a prior art block diagram showing relevant parts of a known controller for a wire electric discharge machine adopted to improve surface accuracy by finish machining.

On the basis of the above, JP 2004-283968A has proposed a controller for a wire electric discharge machine as shown in FIG. 9.

In FIG. 9, an electric discharge pulse generator 1 is for applying an electric discharge pulse voltage across a gap between a wire electrode 4 and a workpiece 5 for electric discharge machining, and comprises a direct-current power source, a circuit including a switching element such as a transistor, a capacitor charging/discharging circuit, etc. Conducting brushes 2 and 3 are for transmitting electricity to the wire electrode, and connected to one of the terminals of the electric discharge pulse generator 1. The workpiece 5 is connected to the other terminal of the electric discharge pulse generator 1. The electric discharge pulse generator 1 applies a pulse voltage between the traveling wire electrode 4 and the workpiece 5. A table (not shown) on which the workpiece 5 is mounted is driven by an X-axis drive motor control device 10, a Y axis drive motor control device 11 and a feed pulse distribution unit 12 which constitute movement means.

FIG. 9 relates to an example in which the average drop voltage Ex is detected as a physical quantity for detecting the amount of machining. Hence, a discharge gap detection unit 6 is connected with the wire electrode 4 and the workpiece 5, detects pulses of gap voltage having a length of several μs or shorter coming from electric discharge pulse generator 1 and supplies the detected values to a machining rate detection unit 7. The machining rate detection unit 7 is for obtaining the average Ex of drop voltage values, namely differences between a set no-load voltage and pulses of gap voltage, in a predetermined period (unit time) T, on the basis of a signal sent out from an arithmetic clock 14 at intervals of the predetermined period (unit time) T, and constitutes machining rate determining means for determining the machining rate. A reference machining rate storage unit 8 is for storing a drop voltage value Es corresponding to a reference rate of machining which is inputted in advance.

In the reference machining rate storage unit 8, a drop voltage value Es corresponding to a predetermined reference rate of machining is stored. A comparison/determination unit 9 compares the average drop voltage value Ex in the unit time (predetermined period) T obtained by the machining rate detection unit 7 and the drop voltage value Es corresponding to the reference rate of machining supplied from the reference machining rate storage unit 8, at intervals of the unit time (predetermined period) T, and supplies the ratio (Es/Ex) between the drop voltage value Es corresponding to the reference rate of machining and the average drop voltage value Ex, to a feed pulse calculation unit 13.

On the basis of the signal sent out from the arithmetic clock 14 at intervals of the unit time (predetermined period) T, the feed pulse calculation unit 13 obtains the motion amount δx by multiplying a distance (SPD*T), which is obtained from a feed speed SPD supplied from feed speed setting means 15 and the predetermined period T, and the ratio (Es/Ex) between the drop voltage value Es corresponding to the reference amount of machining and the average drop voltage value Ex, which is supplied from the comparison/determination unit 9, and sends a train of pulses corresponding to the motion amount δx to the feed pulse distribution unit 12. On the basis of the train of pulses supplied, the feed pulse distribution unit 12 supplies X-axis drive pulses and Y-axis drive pulses to the X axis drive motor control device 10 and the Y-axis drive motor control device 11 according to machining programs, to drive an X-axis motor and a Y-axis motor for driving the table on which the workpiece 5 is mounted.

With the controller arranged as described above, finish machining can be performed with the constant amount of machining, stably and with high surface accuracy.

Figures 10, 11:
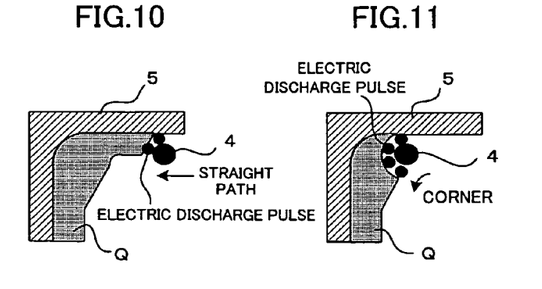
FIG. 10 is a diagram for explaining machining before entrance into a corner portion.
FIG. 11 is a diagram for explaining machining in the corner portion.

However, there remains a problem. In finish machining in wire electric discharge machining, namely second cutting and subsequent machining, normally, a part of several μm to several tens μm in width is removed from a machined surface of a workpiece. However, as shown in FIG. 10, in a region that forms a corner (referred to as "corner portion"), the part Q that remains to be removed after previous machining (referred to as "remaining part") has a width much greater than that in a straight-line portion. In some cases, a remaining part Q of several hundreds μm in width needs to be removed. The technique disclosed in JP 2004-283968A is a control method for improving the surface roughness and accuracy by removing a part of several μm to several tens μm in width from the machined surface. However, in a region such as a corner portion in which the amount of machining is very large, it is difficult to perform control on the basis of the normal ratio of the distance of movement to the amount of machining. In such case, machining is unstable such that short circuits are produced repeatedly, and cannot provide high form accuracy.

SUMMARY OF THE INVENTION

The present invention provides a controller for a wire electric discharge machine capable of performing stable finish machining with high accuracy even at a corner portion of a machining path where a large width of part to be removed remains after previous machining.

The controller of the present invention controls the wire electric discharge machine for performing machining of removing part of a workpiece by electric discharge generated between a wire electrode and the workpiece while moving the wire electrode relative to the workpiece.

According to one aspect of the present invention, the controller comprises: machining rate determining means for determining a machining rate which is an amount of removed part of the workpiece in a predetermined time period; motion control means for controlling motion of the wire electrode relative to the workpiece in accordance with the determined machining rate such that a motion rate, which is an amount of motion of the wire electrode relative to the workpiece in the predetermined time period, decreases when the machining rate increases; switching means for switching a set value of the motion rate for a reference value of the machining rate from a first value to a second value smaller than the second value when the machining rate increases to be greater than a first threshold, and changing the set value of the motion rate back to the first value when the machining rate decreases to be lower than a second threshold.

According to another aspect of the present invention, the controller comprises: machining rate determining means for determining a machining rate which is an amount of removed part of the workpiece in a predetermined time period; motion control means for controlling motion of the wire electrode relative to the workpiece along a machining path in accordance with the determined machining rate such that a motion rate, which is an amount of motion of the wire electrode relative to the workpiece in the predetermined time period, decreases when the machining rate increases; switching means for switching a set value of the moving rate for a reference value of the machining rate from a first value to a second value lower than the first value when the machining rate increases to be greater than a first threshold in machining a corner portion of the machining path, and changing the set value of the moving rate back to the first value when the machining of the corner portion is completed.

The machining rate determining means may obtain the number of repetitions of electric discharge in each predetermined time period, and the motion control means may control the motion of the wire electrode relative to the workpiece based on comparison of the obtained number of repetitions of electric discharge with a reference number of repetitions of electric discharge in the predetermined time period.

Alternatively, the machining rate determining means may obtain an average drop voltage based on a set no-load voltage and an average machining voltage, and the motion control means controls the motion of the wire electrode relative to the workpiece based on comparison of the obtained average drop voltage with a reference drop voltage.

According to still another aspect of the present invention, the controller comprises: electric discharge repetition number determining means for determining the number of repetitions of electric discharge in each predetermined time period; motion control means for control the motion of the wire electrode relative to the workpiece in accordance with a motion command; reference electric discharge repetition number storage means storing a reference number of repetitions of electric discharge; means for obtaining a ratio between the determined number of repetitions of electric discharge and the stored reference number of repetitions of electric discharge; means for determining an amount of motion of the wire electrode relative to the workpiece in each predetermined time period by multiplying the determined ratio by a product of a set feed speed and the predetermined time period, and outputting the determined amount of motion to the motion control means as the motion command; and switching means for switching the set feed speed from a first value to a second value smaller than the first value when the determined ratio decreases to be lower than a first threshold ratio or the determined number of repetitions of electric discharge increases to be greater than a first threshold number, and switching the set feed speed back to the first value when the determined ratio increases to be greater than a second reference ratio or the determined number of repetitions of electric discharge decreases to be lower than a second threshold number.

According to still another aspect of the present invention, the controller comprises: electric discharge repetition number counting means for determining the number of repetitions of electric discharge in each predetermined time period; motion control means for control the motion of the wire electrode relative to the workpiece along a machining path in accordance with a motion command; reference electric discharge repetition number storage means storing a reference number of repetitions of electric discharge; means for obtaining a ratio between the determined number of repetitions of electric discharge and the stored reference number of repetitions of electric discharge; means for determining an amount of motion of the wire electrode relative to the workpiece in every predetermined time period by multiplying the determined ratio by a product of a set feed speed and the predetermined time period, and outputting the determined amount of motion to the motion control means as the motion command; and switching means for switching the set feed speed from a first value to a second value smaller than the first value when the determined ratio decreases to be lower than a first threshold ratio or the determined number of repetitions of electric discharge increases to be greater than a first threshold number in machining a corner portion of the machining path, and switching the set feed speed back to the first value when the machining of the corner portion is completed.

According to still another aspect of the present invention, the controller comprises: drop voltage calculation means for determining an average drop voltage which is a difference between a set no-load voltage and an average machining voltage between the wire electrode and the workpiece; motion control means for controlling the motion of the wire electrode relative to the workpiece in accordance with a motion command; reference value storage means storing a reference value of the average drop voltage; means for obtaining a ratio between the determined average drop voltage and the reference value stored in the reference value storage means; means for determining an amount of motion of the wire electrode relative to the workpiece in every predetermined time period by multiplying the determined ratio by a product of a set feed speed and the predetermined time period, and outputting the determined amount of motion to the motion control means as the motion command; and switching means for switching the set feed speed from a first value to a second value smaller than the first value when the determined ratio decreases to be lower than a first threshold ratio or the determined number of repetitions of electric discharge increases to be greater than a first threshold number, and switching the set feed speed back to the first value when the determined ratio increases to be greater than a second reference ratio or the determined number of repetitions of electric discharge decreases to be lower than a second threshold number.

According to still another aspect of the present invention, the controller comprises: drop voltage calculation means for determining an average drop voltage which is a difference between a set no-load voltage and an average machining voltage between the wire electrode and the workpiece; motion control means for controlling the motion of the wire electrode relative to the workpiece along a machining path in accordance with a motion command; reference value storage means storing a reference value of the average drop voltage; means for obtaining a ratio between the determined drop voltage value and the value stored in the reference value storage means; means for determining an amount of motion of the wire electrode relative to the workpiece in every predetermined time period by multiplying the determined ratio by a product of a set feed speed and the predetermined time period, and outputting the determined amount of motion to the motion control means as the motion command; and switching means for switching the set feed speed from a first value to a second value smaller than the first value when the determined ratio decreases to be lower than a first threshold ratio or the determined number of repetitions of electric discharge increases to be greater than a first threshold number in machining a corner portion of the machining path, and switching the set feed speed back to the first value when the machining of the corner portion is completed.

With the above arrangements of the present invention, stable finish machining with high accuracy can be performed even at a corner portion of a machining path where a part to be removed remains after previous machining has a width much larger than that in a straight line portion of the machining path.

DETAILED DESCRIPTION

Figure 1:
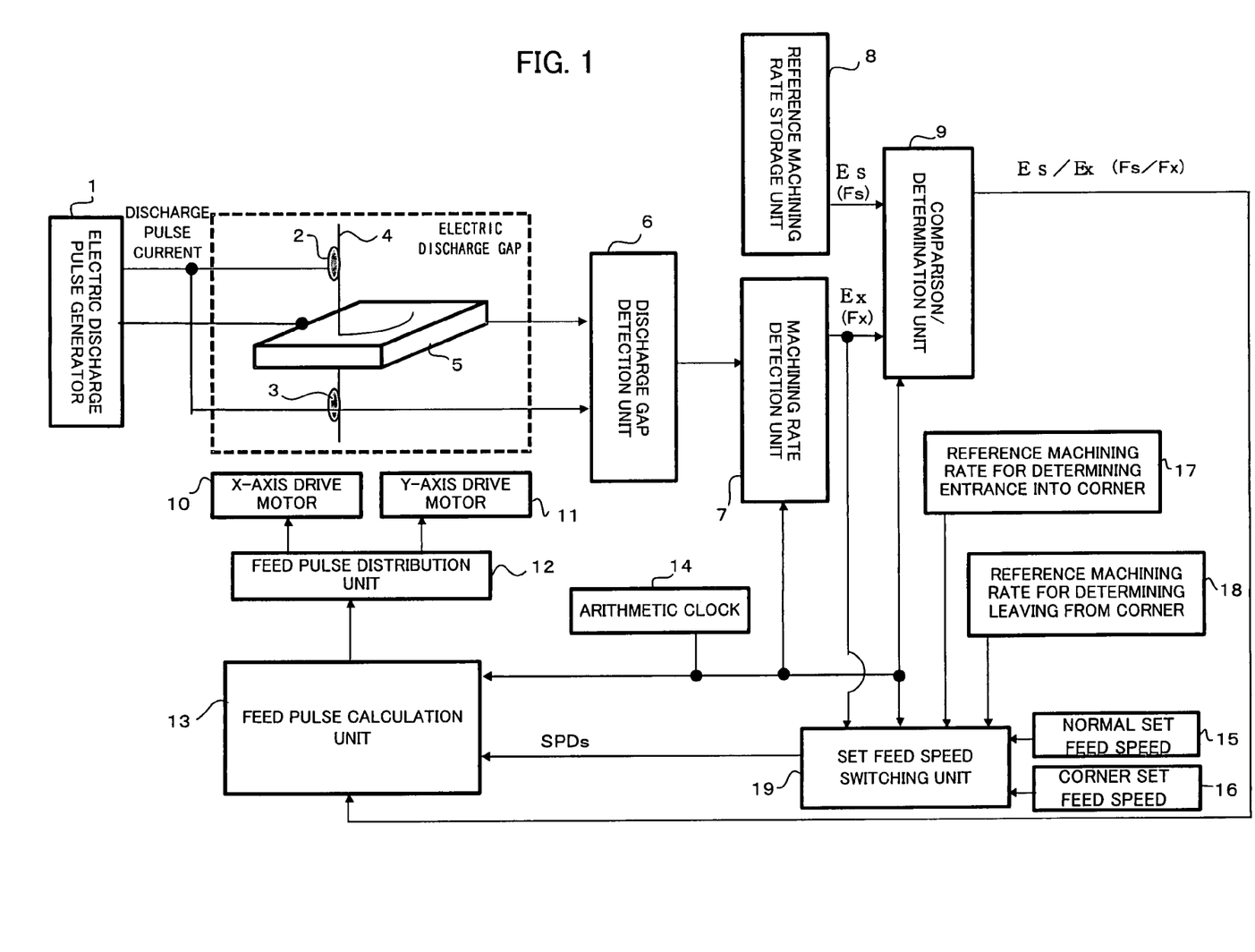
FIG. 1 is a block diagram showing relevant parts of a controller for a wire electric discharge machine in one embodiment of this invention.

FIG. 1 is a block diagram showing relevant parts of a controller for a wire electric discharge machine in one embodiment of this invention. An electric discharge pulse generator 1 is for applying an electric discharge pulse voltage across a gap between a wire electrode 4 and a workpiece 5 for electric discharge machining, and comprises a direct-current power source, a circuit including a switching element such as a transistor, a capacitor charging/discharging circuit, etc. Conducting brushes 2 and 3 are for transmitting electricity to the wire electrode 4, and connected to one of the terminals of the electric discharge pulse generator 1. The workpiece 5 is connected to the other terminal of the electric discharge pulse generator 1. The electric discharge pulse generator 1 applies a pulse voltage between the traveling wire electrode 4 and the workpiece 5. A table (not shown) on which the workpiece 5 is mounted is driven by an X-axis drive motor control device 10, a Y-axis drive motor control device 11 and a feed pulse distribution unit 12 which constitute movement means.

A discharge gap detection unit 6 is connected with the wire electrode 4 and the workpiece 5, detects pulses of gap voltage having a length of several μs or shorter coming from the electric discharge pulse generator 1 and supplies the detected values to a machining rate detection unit 7. The machining rate detection unit 7 is for obtaining the average Ex of drop voltage values, namely differences between a preset no-load voltage and pulses of gap voltage, in a predetermined period (unit time) T, on the basis of a signal sent out from an arithmetic clock 14 at intervals of the predetermined period (unit time) T, and constitutes machining rate determining means for determining the rate of machining as described later. A reference machining rate storage unit 8 is for storing a drop voltage value Es corresponding to the reference rate of machining which is inputted in advance.

A comparison/determination unit 9 compares the average drop voltage value Ex in the unit time (predetermined period) T obtained by the machining rate detection unit 7 and the drop voltage value Es corresponding to the reference rate of machining supplied from the reference machining rate storage unit 8, at intervals of the unit time (predetermined period) T, and supplies the ratio (Es/Ex) between the drop voltage value Es corresponding to the reference rate of machining and the average drop voltage value Ex, to a feed pulse calculation unit 13.

On the basis of the signal sent out from the arithmetic clock 14 at intervals of the unit time (predetermined period) T, the feed pulse calculation unit 13 obtains the motion amount δx by multiplying a distance (SPDs*T), which is obtained from a feed speed SPDs supplied from a set feed speed switching unit 19 (described later) and the predetermined period T, and the ratio (Es/Ex) between the drop voltage value Es corresponding to the reference rate of machining and the average drop voltage value Ex, which is supplied from the comparison/determination unit 9, and sends a train of pulses corresponding to the motion amount δx to the feed pulse distribution unit 12. On the basis of the train of pulses supplied, the feed pulse distribution unit 12 supplies X-axis drive pulses and Y-axis drive pulses to the X-axis drive motor control device 10 and the Y-axis drive motor control device 11 according to machining programs, to drive an X-axis motor and a Y-axis motor for driving the table on which the workpiece 5 is mounted.

The set feed speed switching unit 19 compares the average drop voltage value Ex in the unit time (predetermined period) T obtained by the machining rate detection unit 7 with a reference rate of machining supplied from a entrance-into-corner determination reference machining rate storage unit 17 or a reference rate of machining supplied from a leaving-from-corner determination reference machining rate storage unit 18, on the basis of the signal sent out from the arithmetic clock 14 at intervals of the unit time (predetermined period) T, and supplies a set feed speed supplied from normal set feed speed setting means 15 or a set feed speed supplied from corner set feed speed setting means 16, to the feed pulse calculation unit 13.

When finish machining comes into a corner portion as shown in FIG. 10, the removal width (width of the remaining part Q) increases to a great degree, so that the average drop voltage value Ex increases. When the average drop voltage value Ex exceeds a set value stored in the entrance-into-corner determination reference machining rate storage unit 17, the set feed speed switching unit 19 changes the reference speed SPDs from a normal feed speed SPD1 set in the normal set feed speed setting means 15 to a corner set feed speed SPD2 set in the corner set feed speed setting means 15 and supplies the reference speed SPDs thus changed to the feed pulse calculation unit 13. When the machining of the corner portion finishes, so that the average drop voltage value Ex becomes smaller than a set value stored in the leaving-from-corner determination reference machining rate storage device 18, the set feed speed switching unit 19 changes the reference speed SPDs to the normal feed speed SPD1 set in the normal set feed speed setting means 15 and supplies it to the feed pulse calculation unit 13.

Figure 2:
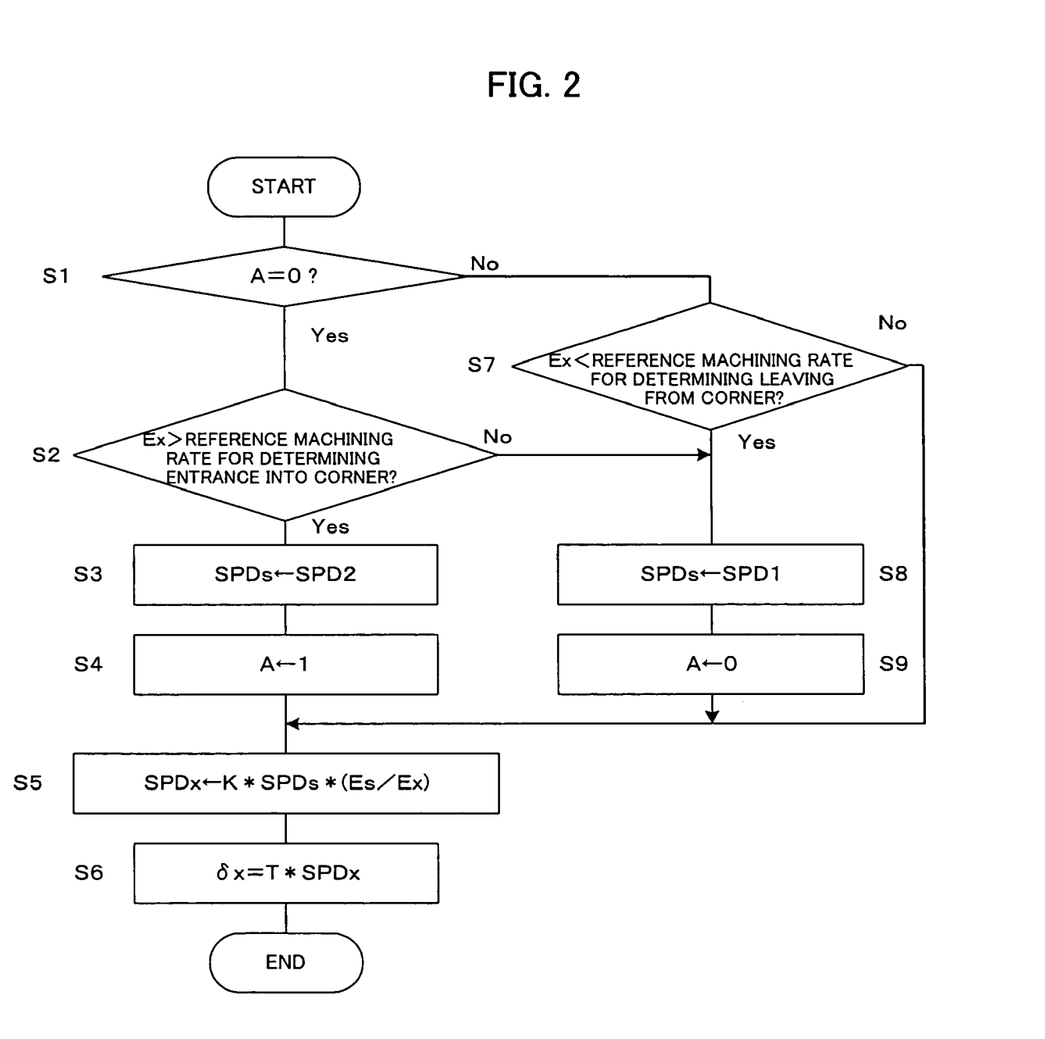
FIG. 2 is a flow chart showing a speed switching process in this embodiment.

FIG. 2 is a flow chart showing a speed switching process performed by a processor of the controller for a wire electric discharge machine, which includes the set feed speed switching unit 19 and the feed pulse calculation unit 13.

Figure 13:
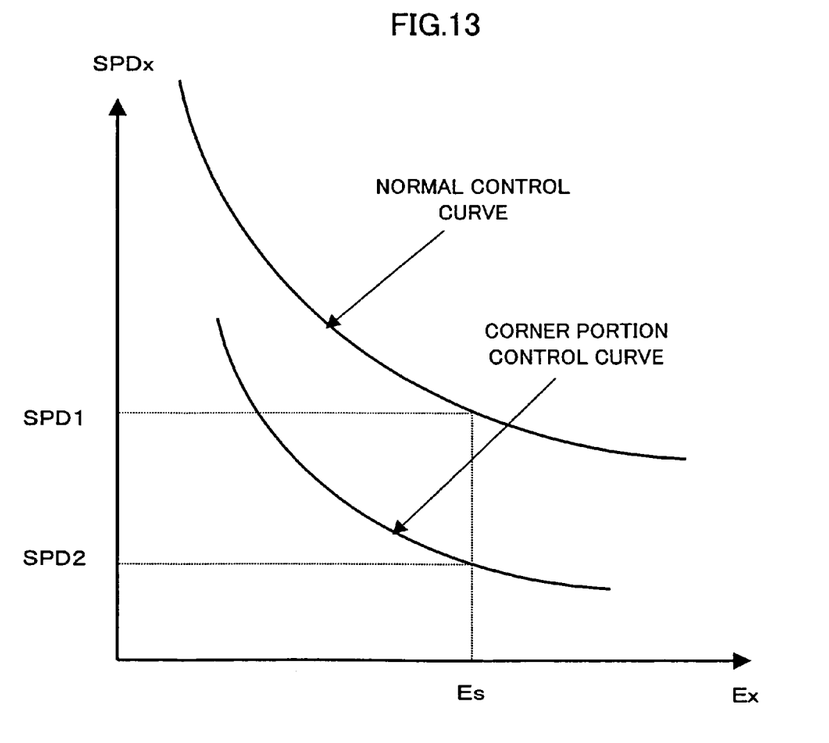
FIG. 13 is a diagram for explaining how control is performed in one embodiment of this invention.

First, the processor determines whether a flag A for indicating that corner portion control is being performed (referred to as "corner portion control flag") is "0" or not. In normal machining, the flag A=0. The processor goes to Step S2, where the processor determines whether or not the average drop voltage value Ex is greater than the reference machining rate for determining entrance into corner. If the average drop voltage value Ex is smaller, the processor goes from Step S2 to Step S8, where the processor sets the reference feed speed SPDs to the normal machining set feed speed SPD1. Then the processor sets the flag A to "0" (step S9) and goes to Step S5, where the processor calculates the speed SPDx according to equation (12). Then the processor obtains the amount of machining δx by multiplying the speed SPDx and the unit time (predetermined period) T, and supplies the amount of machining δx to the feed pulse distribution unit 12. FIG. 13 shows the graph of equation (12). Control is performed such that the speed SPDx varies according to the normal control curve shown in FIG. 13.

When machining comes into the corner portion, the removal width (width of the remaining part Q) increases to a great degree, so that the electric discharge area, namely the area that undergoes electric discharges between the wire electrode 4 and the workpiece 5 increases as shown in FIG. 11, so that the average drop voltage value Ex increases, so that, in Step S2, it is determined that the average drop voltage value Ex is greater than the reference machining rate for determining entrance into corner. Thus, the processor goes from Step S2 to Step S3, where the processor sets the reference feed speed SPDs to the corner machining set feed speed SPD2. Then the processor sets the flag A to "1" (step S4) and goes to Step S5, where the processor calculates the speed SPDx according to equation (12).

In this case, since the reference feed speed SPDs is set to the corner machining set feed speed SPD2, feed control according to the corner portion control curve shown in FIG. 13 is started. The corner portion control curve shows SPD2<SPD1, which means that the ratio of the distance of movement to the amount of machining is smaller. Thus, it is possible to remove the part of large removal width remaining after previous machining, while enjoying the merits of the conventional technique for improving the surface roughness and accuracy after previous machining, using equation (12).

Figure 12:
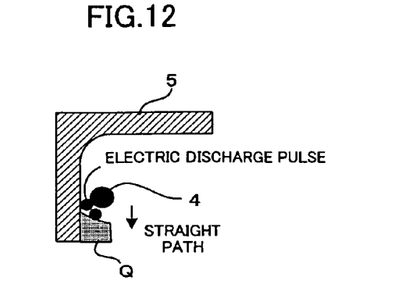
FIG. 12 is a diagram for explaining machining after leaving from the corner portion.

After this, since the corner control flag A=1 (which means that corner control is being performed), the processor goes from Step S1 to Step S7, and then goes to Steps S5 and S6. Thus, until it is determined in Step S7 that the average drop voltage value Ex is smaller than the reference machining rate for determining leaving from corner, feed control according to the corner portion control curve in FIG. 13 is continued. When the machining further proceeds and comes out of the corner portion, the electric discharge area, namely the area that undergoes electric discharges between the wire electrode 4 and the workpiece 5 decreases as shown in FIG. 12, so that the average drop voltage value Ex decreases. When, in Step 7, it is determined that the average drop voltage value Ex is smaller than the leaving-from-corner determination reference machining rate, the processor goes from Step S7 to Step S8, where the processor sets the reference feed speed SPDs to the normal machining set feed speed SPD1. Then the processor sets the corner control flag A to "0" (step S9) and goes to Step S5, to thereby return to the feed control according to the normal control curve in FIG. 13.

In the above-described embodiment, the end of the corner portion is recognized by determining in Step S7 in FIG. 2 that the average drop voltage value Ex is smaller than the leaving-from-corner determination reference machining rate. Alternatively, it can be arranged such that leaving out of the corner portion is recognized from machining programs.

Figure 3:
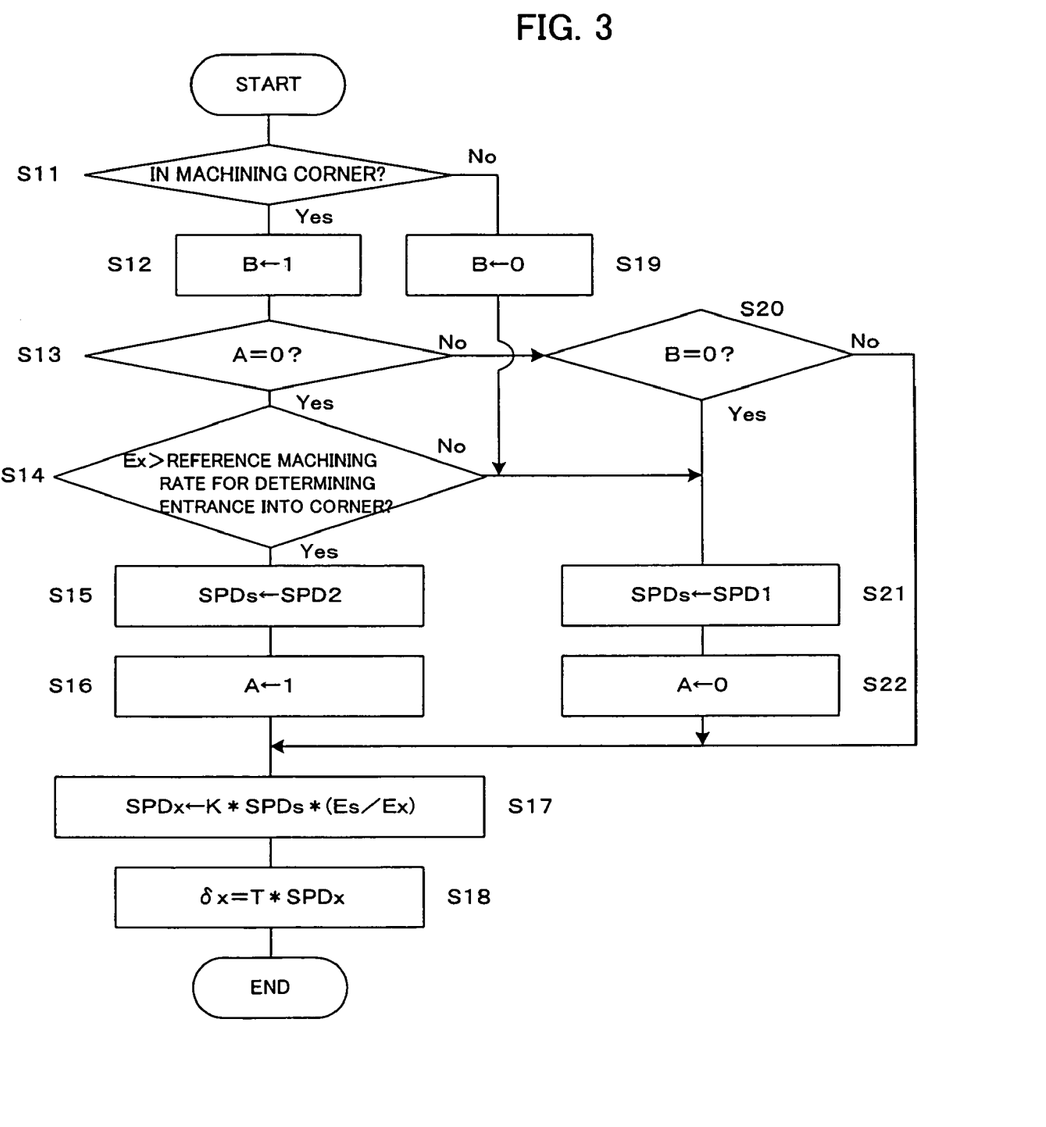
FIG. 3 is a flow chart showing another speed switching process in this embodiment.

FIG. 3 is a flow chart showing an alternative speed switching process in which whether the machining has come out of the corner portion or not is determined on the basis of machining programs.

The processor determines whether the corner portion is being machined or not, on the basis of the machining programs (Step S11). If not, the processor sets a flag for indicating that the corner portion is being machined (referred to as "corner portion machining flag") B to "0" (Step S19), sets the reference feed speed SPDs to the normal machining set feed speed SPD1 (Step S21), sets the corner portion control flag A to "0", and goes to Step S17. In Step S17, the processor calculates the feed speed SPDx according equation (12), and then obtains the motion amount δx by multiplying the feed speed SPDx and the unit time (predetermined period) T and supplies the motion amount δx to the feed pulse distribution unit 12 (Step S18). Then, as long as it is not determined that the corner portion is being performed, on the basis of the machining programs, a series of Steps S11, S19, S21, S22, S17 and S18 is performed repeatedly. Consequently, the feed control according to the normal control curve in FIG. 13 is performed.

When the processor determines that the corner portion is being machined, on the basis of the machining programs, the processor sets the corner portion machining flag B to "1" (Step S12), and determines whether the corner portion control flag A is "0" or not (Step S13). Since the corner portion control flag A has been initially set to "0", the processor goes to Step S14, where the processor determines whether or not the average drop voltage value Ex is greater than the reference machining rate for determining entrance into corner (Step S14). If the average drop voltage value Ex is smaller, the processor goes to Step S21, and performs Steps S21, S22, S17 and S18.

When the removal width (width of the remaining part Q) increases as shown in FIG. 11, so that it is determined that the average drop voltage value Ex is greater than the entrance-into-corner determination reference machining rate, the processor sets the reference feed speed SPDs to the corner portion machining set feed speed SPD2 (Step S15), sets the corner portion control flag A to "1" and goes to Step S17. In Step S17, the processor calculates the feed speed SPDx according to equation (12), and then obtains the motion amount δx by multiplying the feed speed SPDx and the unit time (predetermined period) T and supplies the motion amount δx to the feed pulse distribution unit 12 (Step S18).

In subsequent periods, since the corner portion control flag A has been set to "1", the processor goes from Step S13 to Step S20, where the processor determines whether the corner portion machining flag B is "0" or not. Since the flag B has been set to "1" in Step S12, the processor goes from Step S20 to Step S17, where the feed speed SPDx is obtained using the reference feed speed SPDs which has been already set to the corner machining set feed speed SPD2 in Step S15. After this, a series of Steps S11, S12, S13, S20, S17 and S18 is performed repeatedly, so that the feed control according to the corner portion control curve in FIG. 13 is performed.

When the machining further proceeds and the processor determines, on the basis of the machining programs, that the machining has come out of the corner portion, the processor goes from Step S11 to Step 19, where the processor sets the corner portion machining flag B to "0". Then the processor sets the reference feed speed SPDs to the normal machining set feed speed SPD1 (Step S21), sets the corner control flag A to "0" (Step S22) and goes to Step S17, to thereby return to the feed control according to the normal control curve in FIG. 13.

In the above-described embodiments, the rate of machining is identified on the basis of the drop of the gap voltage, namely the voltage across the gap between the wire electrode 4 and the workpiece 5. However, as previously mentioned, the rate of machining may be identified on the basis of the number of repetitions of electric discharge which is detected from, for example, the gap voltage, in which case, the same result can be obtained using equation (5). In this case, the discharge gap detection unit 6 shown in FIG. 1 comprises means for detecting electric discharges, and the machining rate detection unit 7 comprises electric discharge repetition number count means for obtaining the number of repetitions of electric discharge Fx, namely the number of times that electric discharges are produced in the unit time T. The reference machining rate storage unit 8 is means for storing the number of repetitions of electric discharge Fs corresponding to the reference rate of machining, and the comparison/determination unit 9 comprises means for obtaining the ratio (Fs/Fe) between the numbers of repetitions of electric discharge Fs and Fx.

Figure 4:
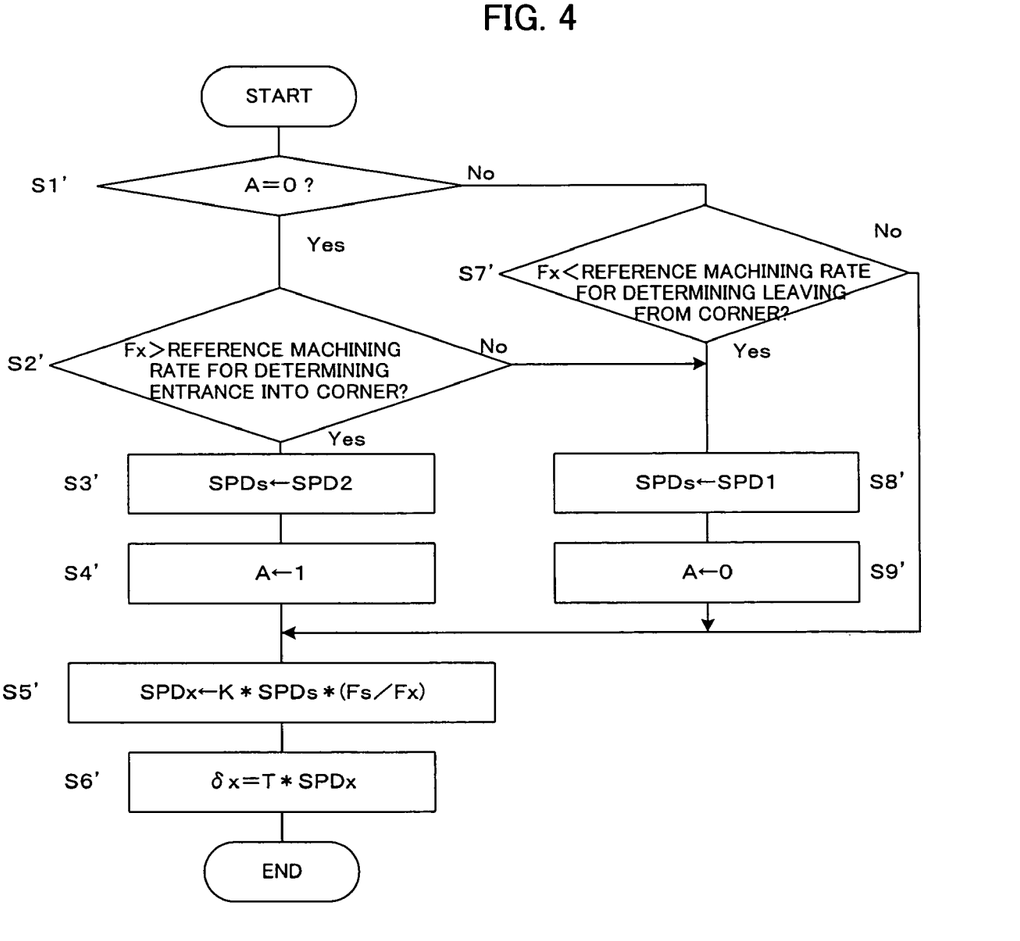
FIG. 4 is a flow chart showing a speed switching process in a second embodiment of this invention.

The process replacing the process shown in FIG. 2 is shown in the form of a flow chart in FIG. 4.

From the comparison between FIG. 2 and FIG. 4, it can be seen that Steps S1 to S9 correspond to Steps S1' to S9', and that the only difference is Steps S2' S7' and S5' which replace Steps S2, S7 and S5.

Specifically, in Step S2', it is determined whether or not the number of repetitions of electric discharge Fx in the predetermined period T is greater than the reference machining rate for determining entrance into corner (number of repetition of electric discharges). In Step S7', it is determined whether or not the number of repetitions of electric discharge Fx in the predetermined period T is smaller than the reference machining rate for determining leaving from corner (number of repetition of electric discharges). In Step S5', the feed speed SPDx is calculated according to equation (5), or in other words, the feed speed SPDx is obtained by multiplying the proportionality constant K, the reference feed speed SPDs set in Step S3' or S8', and the ratio (Fs/Fx) between the reference number of repetitions of electric discharge Fs and the number of detected repetitions of electric discharge Fx.

Figure 5:
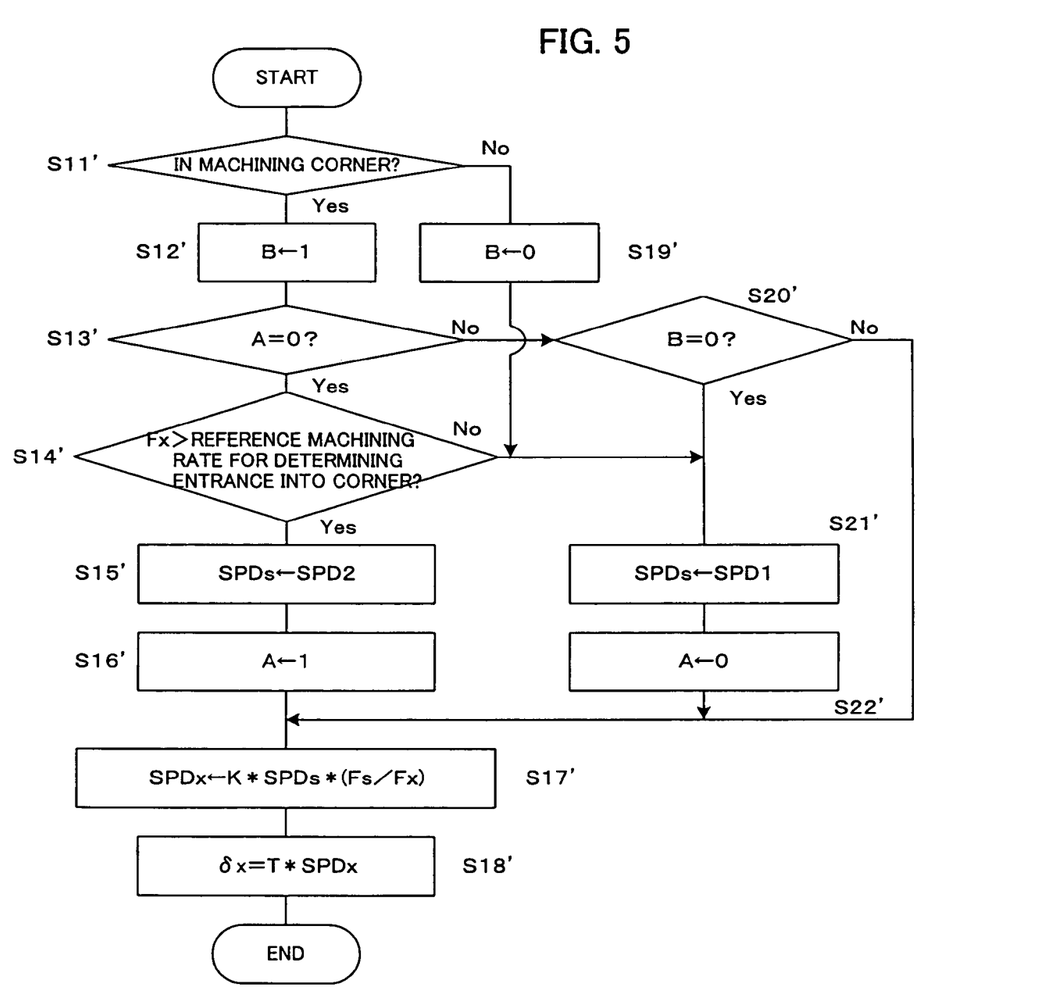
FIG. 5 is a flow chart showing another speed switching process in the second embodiment.

The process in which control is performed by changing the feed speed on the basis of the number of repetitions of electric discharge and which replaces the process shown in FIG. 3 is shown in FIG. 5. In this case, Steps S11 to S22 in FIG. 3 correspond to Steps S11' to S22' in FIG. 5. The only difference is: in Step S14' which replaces Step S14, it is determined whether or not the number of repetitions of electric discharge Fx in the predetermined period T is greater than the reference machining rate (number of repetitions of electric discharge) for determining entrance into corner; and in Step S17' which replaces Step S17, the feed speed SPDx is calculated according to equation (5) using the ratio (Fs/Fx) between the numbers of repetitions of electric discharge. In the other respects, the process is the same as that shown in FIG. 3. Hence, the detailed explanation thereof will be omitted.

In the above-described embodiments, the set feed speed switching unit 19 changes the reference feed speed SPDs when it is found that the drop voltage value Ex or the number of repetitions of electric discharge Fx has exceeded the entrance-into-corner determination reference machining rate (see Steps S2, S14, S2' and S14') and when it is found that the drop voltage value Ex or the number of repetitions of electric discharge Fx has become smaller than the reference machining rate for determining leaving from corner (see Steps S7, S7'). Alternatively, the reference feed speed SPDs may be changed on the basis of the ratio (Es/Ex) between the drop voltage values or the ratio (Fs/Fx) between the numbers of repetitions of electric discharge. Specifically, since the reference drop voltage value Es and the reference number of repetitions of electric discharge Fs are constant, decrease in the ratio (Es/Ex) or the ratio (Fs/Fx) means increase in the drop voltage value Ex or the number of repetitions of electric discharge Fx, and hence, increase in the size of the part that remains to be removed. Meanwhile, increase in the ratio (Es/Ex) or the ratio (Fs/Fx) means decrease in the drop voltage value Ex or the number of repetitions of electric discharge Fx, and hence, decrease in the size of the part that remains to be removed.

Thus, the feed speed switching can be arranged such that the reference feed speed SPDs is set to the corner set feed speed SPD2 when the ratio (Es/Ex) or the ratio (Fs/Fx) decreases to below a first reference ratio, and set to the normal set feed speed SPD1 when the ratio (Es/Ex) or the ratio (Fs/Fx) increases to above a second reference ratio.

What is claimed is:

1. A controller for a wire electric discharge machine for performing machining of removing part of a workpiece by electric discharge generated between a wire electrode and the workpiece while moving the wire electrode relative to the workpiece, said controller comprising:

machining rate determining means for determining a machining rate which is an amount of removed part of the workpiece in a predetermined time period;

motion control means for controlling motion of the wire electrode relative to the workpiece in accordance with the determined machining rate such that a motion rate, which is an amount of motion of the wire electrode relative to the workpiece in the predetermined time period, decreases when the machining rate increases;

switching means for switching a set value of the motion rate for a reference value of the machining rate from a first value to a second value smaller than the first value when the machining rate increases to be greater than a first threshold, and changing the set value of the motion rate back to the first value when the machining rate decreases to be lower than a second threshold.

2. A controller for a wire electric discharge machine according to claim 1, wherein said machining rate determining means obtains the number of repetitions of electric discharge in each predetermined time period, and said motion control means controls the motion of the wire electrode relative to the workpiece based on comparison of the obtained number of repetitions of electric discharge with a reference number of repetitions of electric discharge in the predetermined time period.

3. A controller for a wire electric discharge machine according to claim 2, wherein said machining rate determining means obtains an average drop voltage based on a set no-load voltage and an average machining voltage, and said motion control means controls the motion of the wire electrode relative to the workpiece based on comparison of the obtained average drop voltage with a reference drop voltage.

4. A controller for a wire electric discharge machine for performing machining of removing part of a workpiece by electric discharge generated between a wire electrode and the workpiece while moving the wire electrode relative to the workpiece, said controller comprising:

machining rate determining means for determining a machining rate which is an amount of removed part of the workpiece in a predetermined time period;

motion control means for controlling motion of the wire electrode relative to the workpiece along a machining path in accordance with the determined machining rate such that a motion rate, which is an amount of motion of the wire electrode relative to the workpiece in the predetermined time period, decreases when the machining rate increases;

switching means for switching a set value of the motion rate for a reference value of the machining rate from a first value to a second value lower than the first value when the machining rate increases to be greater than a first threshold in machining a corner portion of the machining path, and changing the set value of the moving rate back to the first value when the machining of the corner portion is completed.

5. A controller for a wire electric discharge machine according to claim 4, wherein said machining rate determining means obtains the number of repetitions of electric discharge in each predetermined time period, and said motion control means controls the motion of the wire electrode relative to the workpiece based on comparison of the obtained number of repetitions of electric discharge with a reference number of repetitions of electric discharge in the predetermined time period.

6. A controller for a wire electric discharge machine according to claim 4, wherein said machining rate determining means obtains an average drop voltage based on a set no-load voltage and an average machining voltage, and said motion control means controls the motion of the wire electrode relative to the workpiece based on comparison of the obtained average drop voltage with a reference drop voltage.

7. A controller for a wire electric discharge machine for performing machining of removing part of a workpiece by electric discharge generated between a wire electrode and the workpiece while moving the wire electrode relative to the workpiece, said controller comprising:

electric discharge repetition number determining means for determining the number of repetitions of electric discharge in each predetermined time period;

motion control means for control the motion of the wire electrode relative to the workpiece in accordance with a motion command;

reference electric discharge repetition number storage means storing a reference number of repetitions of electric discharge;

means for obtaining a ratio between the determined number of repetitions of electric discharge and the stored reference number of repetitions of electric discharge;

means for determining an amount of motion of the wire electrode relative to the workpiece in each predetermined time period by multiplying the determined ratio by a product of a set feed speed and the predetermined time period, and outputting the determined amount of motion to said motion control means as the motion command; and switching means for switching the set feed speed from a first value to a second value smaller than the first value when the determined ratio decreases to be lower than a first threshold ratio or the determined number of repetitions of electric discharge increases to be greater than a first threshold number, and switching the set feed speed back to the first value when the determined ratio increases to be greater than a second reference ratio or the determined number of repetitions of electric discharge decreases to be lower than a second threshold number.

8. A controller for a wire electric discharge machine for performing machining of removing part of a workpiece by electric discharge generated between a wire electrode and the workpiece while moving the wire electrode relative to the workpiece, said controller comprising:

electric discharge repetition number counting means for determining the number of repetitions of electric discharge in each predetermined time period;

motion control means for control the motion of the wire electrode relative to the workpiece along a machining path in accordance with a motion command;

reference electric discharge repetition number storage means storing a reference number of repetitions of electric discharge;

means for obtaining a ratio between the determined number of repetitions of electric discharge and the stored reference number of repetitions of electric discharge;

means for determining an amount of motion of the wire electrode relative to the workpiece in every predetermined time period by multiplying the determined ratio by a product of a set feed speed and the predetermined time period, and outputting the determined amount of motion to said motion control means as the motion command; and switching means for switching the set feed speed from a first value to a second value smaller than the first value when the determined ratio decreases to be lower than a first threshold ratio or the determined number of repetitions of electric discharge increases to be greater than a first threshold number in machining a corner portion of the machining path, and switching the set feed speed back to the first value when the machining of the corner portion is completed.

9. A controller for a wire electric discharge machine for performing machining of removing part of a workpiece by electric discharges generated between a wire electrode and the workpiece while moving the wire electrode relative to the workpiece, said controller comprising:

drop voltage calculation means for determining an average drop voltage which is a difference between a set no-load voltage and an average machining voltage between the wire electrode and the workpiece;

motion control means for controlling the motion of the wire electrode relative to the workpiece in accordance with a motion command;

reference value storage means storing a reference value of the average drop voltage;

means for obtaining a ratio between the determined average drop voltage and the reference value stored in said reference value storage means;

means for determining an amount of motion of the wire electrode relative to the workpiece in every predetermined time period by multiplying the determined ratio by a product of a set feed speed and the predetermined time period, and outputting the determined amount of motion to said motion control means as the motion command; and switching means for switching the set feed speed from a first value to a second value smaller than the first value when the determined ratio decreases to be lower than a first threshold ratio or the determined number of repetitions of electric discharge increases to be greater than a first threshold number, and switching the set feed speed back to the first value when the determined ratio increases to be greater than a second reference ratio or the determined number of repetitions of electric discharge decreases to be lower than a second threshold number.

10. A controller for a wire electric discharge machine for performing machining of removing part of a workpiece by electric discharges generated between a wire electrode and the workpiece while moving the wire electrode relative to the workpiece, said controller comprising:

drop voltage calculation means for determining an average drop voltage which is a difference between a set no-load voltage and an average machining voltage between the wire electrode and the workpiece;

motion control means for controlling the motion of the wire electrode relative to the workpiece along a machining path in accordance with a motion command;

reference value storage means storing a reference value of the average drop voltage;

means for obtaining a ratio between the determined drop voltage value and the value stored in said reference value storage means;

means for determining an amount of motion of the wire electrode relative to the workpiece in every predetermined time period by multiplying the determined ratio by a product of a set feed speed and the predetermined time period, and outputting the determined amount of motion to said motion control means as the motion command; and switching means for switching the set feed speed from a first value to a second value smaller than the first value when the determined ratio decreases to be lower than a first threshold ratio or the determined number of repetitions of electric discharge increases to be greater than a first threshold number in machining a corner portion of the machining path, and switching the set feed speed back to the first value when the machining of the corner portion is completed.

* * * * *

UNITED STATES PATENT AND TRADEMARK OFFICE
CERTIFICATE OF CORRECTION

PATENT NO. : 7,262,381 B2 Page 1 of 1
APPLICATION NO. : 11/258950
DATED : August 28, 2007
INVENTOR(S) : Kaoru Hiraga et al.

It is certified that error appears in the above-identified patent and that said Letters Patent is hereby corrected as shown below:

Column 2, Line 28, after "conditions" insert --.--.

Column 3, Line 26, change "δX" to --δx--.

Column 3, Line 62, change "Y axis" to --Y-axis--.

Column 4, Line 40, change "X axis" to --X-axis--.

Column 7, Line 56, change "accuracy." to --accuracy,--.

Column 7, Line 59, change "discharge." to --discharge,--.

Column 7, Line 62, change "discharge." to --discharge,--.

Column 7, Line 65, change "machining." to --machining,--.

Signed and Sealed this

Twenty-ninth Day of April, 2008

JON W. DUDAS
*Director of the United States Patent and Trademark Office*